United States Patent [19]

Hijino et al.

[11] Patent Number: 5,773,403
[45] Date of Patent: Jun. 30, 1998

[54] CLEANING AND DRYING SOLVENT

[75] Inventors: Masamichi Hijino, Hachiohji; Michio Shirai, Kodaira; Kunihiko Uzawa, Osaka, all of Japan

[73] Assignee: Olympus Optical Co., Ltd., Tokyo, Japan

[21] Appl. No.: 504,915

[22] Filed: Jul. 20, 1995

Related U.S. Application Data

[63] Continuation-in-part of Ser. No. 119,121, Sep. 16, 1993, abandoned.

[30] Foreign Application Priority Data

| Jan. 21, 1992 | [JP] | Japan | 4-29998 |
| Feb. 7, 1992 | [JP] | Japan | 4-56867 |
| Apr. 9, 1992 | [JP] | Japan | 4-117009 |
| May 15, 1992 | [JP] | Japan | 4-148633 |
| Jun. 5, 1992 | [JP] | Japan | 4-171721 |

[51] Int. Cl.$^6$ .............................. C11D 7/50; C11D 7/60; B01D 12/00
[52] U.S. Cl. .............................. 510/411; 134/40; 134/42; 510/163; 510/177; 510/365; 510/466; 510/245
[58] Field of Search .................................. 134/40, 42, 38; 510/163, 175, 177, 365, 407, 466, 411, 245

[56] References Cited

U.S. PATENT DOCUMENTS

| 4,210,496 | 7/1980 | Wong | 203/46 |
| 4,324,595 | 4/1982 | Kasprzak | 134/38 |
| 4,613,380 | 9/1986 | Chen | 134/42 X |
| 4,968,381 | 11/1990 | Prigge et al. | 134/26 X |
| 5,256,191 | 10/1993 | Thompson et al. | 106/19 A |
| 5,316,692 | 5/1994 | John | 252/173 X |
| 5,403,402 | 4/1995 | LeGrow | 134/38 X |
| 5,403,514 | 4/1995 | Matsuhisa et al. | 134/40 X |
| 5,478,493 | 12/1995 | Flaningam et al. | 134/40 X |
| 5,503,681 | 4/1996 | Inada et al. | 134/40 X |
| 5,562,945 | 10/1996 | Hijino et al. | 134/40 X |
| 5,628,833 | 5/1997 | McCormack et al. | 134/26 |
| 5,647,914 | 7/1997 | Goto et al. | 134/10 |

FOREIGN PATENT DOCUMENTS

| 707060 | 4/1996 | European Pat. Off. . |
| 5184808 | 7/1993 | Japan . |
| 6122898 | 5/1994 | Japan . |
| 7179890 | 7/1995 | Japan . |
| 2238793 | 6/1991 | United Kingdom . |
| 94/26864 | 11/1994 | WIPO . |

OTHER PUBLICATIONS

*Journal of Chemical and Engineering Data*, vol. 11, No. 4, Oct. 1966, pp. 535–537, "Vapor–Liquid Equilibrium for the Hexamethyldisiloxane–n–Propyl Alcohol System", Charles A. Killgore, W.W. Chew and Virgil Orr.

*Dissertation Abstracts International*, B—The Sciences and Engineering, vol. 34, No. 5B, 1973, pp. 2000–2001, "Vapor–Liquid Equilibrium Relations in Non–Ideal Systems—The Binary Systems: Hexamethyldisiloxane–Toluene Hexamethyldisiloxane–Ethyl Alcohol and Ethyl Alcohol–Toluene at 40°, 50°, 60° and 70° C.", Jorge Arciniega Guzman, PhD. Month unknown.

*Journal of Chemical Engineering Data*, vol. 25, No. 3, 1980, pp. 230–232, "Liquid–Vapor Equilibria in Binary Systems of Hexamethyldisiloxane–1–Butanol, –2–Butanol, and –2–Methyl–1–1–propanol", Aleksander Radecki and Barbara Kaczmarek. Month unknown.

Dickinson et al., Thermodynamics of Mixtures, pp. 2321–2327 (1974). Month unknown.

Chemical Abstracts, vol. 82, 1975, 176001h. Month unknown.
Chemical Abstracts, vol. 84, 1976, 185502r. Month unknown.
Chemical Abstracts, vol. 88, 1978, 12567v. Month unknown.
Chemical Abstracts, vol. 102, 1985, 101299j. Month unknown.
Chemical Abstracts, vol. 97, 1982, 223498x. Month unknown.
Chemical Abstracts, vol. 114, 1991, 24191w. Month unknown.
Chemical Abstracts, vol. 82, 1975, 103919d. Month unknown.

*Primary Examiner*—Douglas J. McGinty
*Attorney, Agent, or Firm*—Ostrolenk, Faber, Gerb & Soffen, LLP

[57] ABSTRACT

A cleaning and drying solvent is disclosed which has excellent cleaning power and drying property and finds uses as a hand-cleaning agent, a precise cleaning agent and a drying agent for industrial parts. Since it does not contain halogens causing the depletion of the ozone layer, it is available as a solvent replacing freon. The cleaning and drying solvent is composed of a siloxane compound, in particular, hexamethyldisiloxane, an azeotropic or azeotrope-like composition of hexamethyldisiloxane and a lower alcohol, or a mixture of hexamethyldisiloxane and each of ketones, carboxylic esters, low molecular saturated hydrocarbons and low molecular alcohols.

9 Claims, No Drawings

CLEANING AND DRYING SOLVENT

CROSS REFERENCE TO RELATED APPLICATIONS

This is a continuation-in-part application of U.S. application Ser. No. 08/119,121, filed Sept. 16, 1993 and now abandoned.

TECHNICAL FIELD

This invention relates to a cleaning and drying solvent capable of use in simple cleaning applications such as that performed by hand, precise cleaning applications such as degreasing or finish drying to be effected for industrial parts made of metals, glasses, plastics or the like, such as optical and electronic parts, molded parts, metal molds or the like. In particular, the present invention relates to a cleaning and drying solvent capable of use as a replacement for freon, the cut of consumption of which is now of world-wide concern.

BACKGROUND ART

In general, optical and molded parts are subjected to simple cleaning such as that conducted by hand with a cotton paper or cloth impregnated with a solvent in order to remove fingerprints, mist and the like after the production of such parts. Also, similar simple cleaning by hand is conducted for the maintenance of a metal mold or the like. On the other hand, industrial parts such as optical parts, electronic parts and the like are subjected to precise cleaning for degreasing and are also dried with drying solvents after cleaning. 1,1,2-trichloro-1,2,2-trifluoroethane (freon 113) is conventionally used for such cleaning and drying treatment. The reason is that freon 113 is incombustible, of low toxicity level and fast in drying rate and has a selective solubility such that no corrosive effects are exerted on high molecular weight materials such as plastics, rubbers and the like while it dissolves greases, oils and the like. On the other hand, a multiplicity of mixed solvents and azeotropic compositions have been developed in order to reduce the amount of the freon 113 used and increase the degreasing power. For example, Japanese Patent Laid-Open No. 17328/1984 discloses that a mixed solvent of freon 113, trichloroethane and dichloromethane is effective in degreasing. Furthermore, Japanese Patent Laid-Open No. 318094/1989 discloses a mixed solvent of freon 113, isopropyl alcohol and methyl ethyl ketone, and Japanese Patent Laid-Open No. 289693/1990 discloses an azeotropic composition comprising dichlorotetrafluoropropane (freon 234) and an aliphatic lower alcohol such as ethanol or the like. Moreover, the use of aliphatic lower alcohols such as IPA and ethanol, ketones such as acetone in pure form and ethers is being studied.

Unfortunately, perhaloethanes such as freon 113 are chemically stable and long in lifetime within the troposphere, so that they arrive at the stratosphere in a diffused state and are decomposed by sunbeams to produce halogen radicals, which cause a chain reaction with ozone to deplete the ozone layer. Thus, it is demanded to reduce the amount used. As mentioned above, it has been attempted to reduce the amount of perhaloethane used by developing a mixed solvent of freon 113 and an organic solvent other than perhaloethane. However, since freon 113 is an essential ingredient, there is still a problem that the amount used cannot be reduced below a certain level. Moreover, although the mixed solvent containing freon 234 having a relatively small depleting property against the ozone layer as compared with freon 113 has been developed as mentioned above, the depletion of the ozone layer cannot completely be eliminated. On the other hand, the mixed solvents using aliphatic lower alcohols, ketones in pure form and ethers are often so highly toxic that they have a problem of badly affecting the health of an operator in use of the solvent.

With the foregoing in mind, an object of the invention is to provide a cleaning and drying solvent having an improved safety without having any effect upon the ozone layer. Another object of the invention is to provide a cleaning and drying solvent having not only the above properties but also possessing excellent degreasing power and drying properties and capable of advantageous use for simple or precise cleaning of industrial parts and for drying such parts after the cleaning.

SUMMARY OF THE INVENTION

The present invention uses a siloxane compound or a mixture of a siloxane compound and another organic compound as an effective ingredient of a solvent. These solvents can be applied for simple and precise cleanings of industrial parts or to effect finish drying after the precise cleaning.

The cleaning and drying solvent according to the invention using the siloxane compound preferably contains a siloxane compound having a viscosity at 25° C. of not greater than 5 cSt as an effective ingredient. Especially preferred siloxane compound is hexamethyldisiloxane having a viscosity at 25° C. of 0.65 cSt. In general, the volatility of the siloxane compound is inversely proportional to the viscosity or molecular weight thereof. Since the viscosity of the siloxane compound as the effective ingredient is as low as not greater than 5 cSt (25° C.), the volatility thereof is high. Furthermore, the low viscosity siloxane compound itself has a solvent behavior, which conducts degreasing for fingerprints, skin fat removal and the like. Moreover, it has lower toxicity and more chemically stable and does not affect cleaning objects such as plastics, rubbers, metals, glasses and the like. In addition, it does not contain a halogen such as chlorine or the like and has no depleting influence on the ozone layer. The siloxane compound having these properties has an excellent quick-drying property and can be used in performing simple hand-cleaning tasks such as finish cleaning for molded and optical parts (e.g., glass lenses, plastics and the like) and maintenance cleaning for molds or the like. Among these siloxane compounds, the following formula 1 is a chemical formula representing straight chain compounds, in which a compound having a viscosity at about 25° C. of not greater than 5 cSt can be selected from among the siloxane compounds within the range of n=0–7. Furthermore, a compound having a cyclic structure can be used as the siloxane compound.

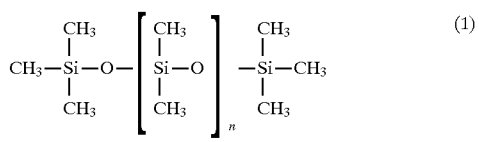

The hand-finish cleaning solution, precise cleaning solution or drying solution for use after cleaning according to the invention may have two or more siloxanes other than the above compound mixed therewith, or may have a stabilizer, a solvent and the like added thereto. As the stabilizer, use may be made of aliphatic nitro compounds such as nitromethane, nitroethane, nitropropane and the like; acetylene alcohols such as 3-methyl-1-butyn-3-ol, 3-methyl-1-pentyn-3-ol and the like; epoxides such as glycidol, methyl glycidyl ether, allyl glycidyl ether, phenyl glycidyl ether, 1,2-butylene oxide, cyclohexene oxide, epichlorohydrin and the like; ethers such as dimethoxymethane, 1,2-dimethoxyethane, 1,4-dioxene, 1,3,5-trioxene and the like; unsaturated hydrocarbons such as hexene, heptene, octene, 2,4,4-trimethyl-1-pentene, pentadiene, octadiene, cyclohexene, cyclopentene and the like; olefinic alcohols such as allyl alcohol, 1-buten-3-ol, 3-methyl-1-buten-3-ol and the like; acrylic esters such as methyl acrylate, ethyl acrylate, butyl acrylate and the like; and mixtures thereof. Further, these compounds may be used together with phenols such as phenol, trimethylphenol, cyclohexylphenol, thymol, 2,6-di-t-butyl-4-methylphenol, butylhydroxyanisole, isooygenol and the like; amines such as hexylamine, pentylamine, dipropylamine, diisopropylamine, diisobutylamine, triethylamine, tributylamine, pyridine, N-methylmorpholine, cyclohexylamine, 2,2,6,6-tetramethylpyridine, N,N'-diallyl-p-phenylenediamine and the like; triazoles such as benzotriazole, 2-(2'-hydroxy-5'-methylphenyl) benzotriazole, chlorobenzotriazole and the like. The qualities such as the above-mentioned volatility, cleaning and degreasing performance and toxicity can be stabilized by adding these stabilizers in an amount of 0.1 to 10 wt % without degrading the beneficial properties of the siloxane.

As the solvent, use may be made of hydrocarbons such as pentane, isopentane, hexane, isohexane, heptane and the like; nitroalkanes such as nitromethane, nitroethane, nitropropane and the like; amines such as diethylamine, triethylamine, isopropylamine, butylamine, isobutylamine and the like; alcohols such as methanol, ethanol, n-propyl alcohol, i-propyl alcohol, n-butanol, i-butanol and the like; ethers such as methylcellosolve, tetrahydrofuran, 1,4-dioxane and the like; ketones such as acetone, methyl ethyl ketone, methyl butyl ketone and the like; esters such as ethyl acetate, propyl acetate, butyl acetate and the like; and mixtures thereof. The dissolving power of the cleaning and drying solvent of the present invention can be increased by adding the above solvent in an amount of 1 to 20 wt %.

In the mixture of the aforementioned latter siloxane compound and organic compound, use may be made of the linear siloxane represented by the above formula 1 or a cyclic siloxane represented by the following formula 2. The straight chain siloxane selected is, for example, hexamethyldisiloxane in which n in the formula 1 is 0. On the other hand, a siloxane compound in which n in the formula 2 is 3–5 can be selected as a cyclic siloxane. Furthermore, it is possible to properly select a siloxane compound having a structure other than those of formula 1 and formula 2.

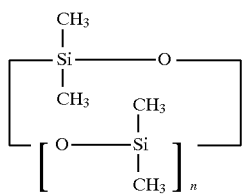

As the organic compound, one of ethanol, methanol and 2-propanol can be selected, while another solvent may be added to this alcohol. Furthermore, at least one of ketones, carboxylic esters, saturated hydrocarbons each having 4 to 8 carbon atoms and alcohols each having 3 to 5 carbon atoms may be selected as the organic compound, and another solvent can be added to this organic compound.

In a mixture of hexamethyldisiloxane and ethanol, methanol or 2-propanol, it is preferred that the mixture be in an azeotropic state (azeotropic composition) or azeotrope-like state (azeotrope-like composition).

Hexamethyldisiloxane is represented by the chemical formula of $(CH_3)_3SiOSi(CH_3)_3$ and has a viscosity of 0.65 cSt (25° C.). The azeotropic composition of the preferable state according to the invention cannot be obtained only by mixing two or more ingredients but is required to assume a state having an azeotropic point or an azeotropic state. Such an azeotropic composition exhibits a constant boiling point different from the boiling points of the individual ingredients and has properties such that the volatilization rate becomes high when the boiling point is low; that the ratio of composition or distillate as a result of evaporation hardly changes; and the like. When the composition having such an azeotropic state contains ethanol, hexamethyldisiloxane is 64.3–63.3 wt % and ethanol is 35.7–36.7 wt % under atmospheric pressure (740–760 mmHg), in which the boiling point of the composition is 71.4° C. In case of methanol, hexamethyldisiloxane is 58.9–59.3 wt % and methanol is 40.7–41.1 wt %, in which the boiling point is 58.7° C. lower than the boiling point of each ingredient, whereby the volatility is improved and the vapor composition and solution composition are substantially the same and any change in composition due to evaporation is barely existent to form a stable solution composition. Moreover, the azeotropic composition consisting of 2-propanol and hexamethyldisiloxane is 54.1–54.5 wt % of hexamethyldisiloxane and 45.5–45.9 wt % of propanol and has a boiling point of 76.4° C., lower than the boiling point of each ingredient, so that the volatility is improved and also the vapor composition and solution composition are substantially the same and there is negligible composition change due to evaporation, thus forming a stable solution composition.

On the other hand, even in the composition of 30–95 wt % of hexadimethyldisiloxane and 5–70 wt % of methanol and the composition of 25–95 wt % of hexamethyldisiloxane and 5–75 wt % of 2-propanol, the apparent boiling points of the compositions are lowered as compared with the boiling point of each ingredient (for example, the boiling point is 77.7° C. at 25 wt % of hexamethyldisiloxane and 75 wt % of 2-propanol), and no substantial composition change due to evaporation occurs, so that the compositions can be put into practice as a hand finishing cleaning solution, precise cleaning solution and drying solution.

Hexamethyldisiloxane as an active ingredient of the mixture according to the invention has low toxicity, is chemically stable and hardly affects plastics, rubbers, metals, glasses and the like. Since it does not contain halogens such as chlorine and the like, there is no negative influence on the ozone layer. The other ingredients such as ethanol, methanol, 2-propanol and the like effect a high degreasing power and rapid removal of contaminants such as oil and fat, etc. Particularly, ethanol has lower toxic effect on the organism as is well known and is high in safety. Therefore, the azeotropic or azeotrope-like mixture consisting of the above constituting ingredients can advantageously and safely be applied as a hand applied finishing solution, a precise cleaning solution or a drying solution after cleaning for industrial parts and the like. When it is used as a solvent and drying solution, the solution control in use is easy and the recovery can easily be conducted for reuse, and further it is possible to conduct steam cleaning.

In the above mixture of hexamethyldisiloxane and ethanol, methanol or 2-propanol, it is possible to add the aforementioned stabilizer and/or solvent in the aforementioned compounding ratio. In this case, it is favorable to use a compound highly effective in stabilizing the azeotropic composition and the azeotrope-like composition and having the properties of being distilled out with the distillate or forming an azeotrope through distillation operation.

Now, the hand finishing, cleaning and drying solvent according to the invention will be described with respect to a mixture of hexamethyldisiloxane with at least one organic compound selected from among ketones, carboxylic esters, saturated hydrocarbons each having 1–8 carbon atoms and alcohols each having 3–5 carbon atoms. In the invention, the ketone is preferably selected from among acetone, methyl ethyl ketone, 2-pentanone, 3-pentanone and methyl isobutyl ketone. The carboxylic ester is preferably selected from among isobutyl formate, methyl acetate, ethyl acetate, propyl acetate, isopropyl acetate, methyl propionate, ethyl propionate and methyl butyrate. Furthermore, the saturated hydrocarbon having 4 to 8 carbon atoms may have either a linear or cyclic structure and is preferably selected from among pentane, 2-methylbutane, n-hexane, 2-methylpentane, 2,2-dimethylbutane, 2,3-di-methylbutane, heptane, heptane isomers, 2,2,3-trimethylpentane, isooctane (2,2,4-trimethylpentane), cyclopentane, methylcyclopentane, cyclohexane and methylcyclohexane.

In the above compounds, 2-methylhexane, 3-methylhexane, 2,3-dimethylpentane and 2,4-dimethylpentane can be used as heptane isomers.

The alcohol having 3 to 5 carbon atoms is preferably selected from among 1-propanol, isobutyl alcohol, tert-butyl alcohol and tert-pentyl alcohol.

A composition having an excellent degreasing power is obtained by incorporating at least one of the ketone, carboxylic ester, saturated hydrocarbon and alcohol. When it is used as a hand finishing solution or drying solution or for precise cleaning, oil, fat and the like can rapidly be removed.

On the other hand, hexamethyldisiloxane is chemically stable and has a lower toxic effect on the organism as previously mentioned, so that the mixture of the above organic compound and hexamethyldisiloxane comes to have considerably lower toxicity as compared with the use of the organic compound alone and reduces the adverse influence upon the organism. In such a mixture of organic compound and hexamethyldisiloxane, the aforementioned stabilizer can be added in the compounding ratio as mentioned above.

In the finish drying subsequent to hand cleaning or precise cleaning, the greater the content of water in a mixture of hexamethyldisiloxane and an alcohol selected from among ethanol, methanol and 2-propanol at the time of its evaporation for drying, the greater the occurrence of stains on the surface of the cleaned and dried object. Ethanol, methanol and 2-propanol as ingredients of the mixture are hydrophilic, so that water is introduced therein not only while they are in pure form but also during the step for producing the mixture. However, as long as the above water content of the mixture is less than 1000 ppm, stains are barely visible on the surface of the cleaned and dried object with the result that a precise surface finishing condition can be obtained. For ensuring the suppression of stain occurrence attributed to the presence of water, it is preferred that the above water content of the mixture be less than 800 ppm.

For realizing a precise clean condition on the surface of the cleaned object, it is requisite that the content of lowly volatile ingredients in the hand cleaning or finish drying composition be below a certain level. When the lowly volatile ingredients are contained over a certain level, they would be a residue left after the hand cleaning or finish drying, thereby rendering formation of a clean surface unfeasible.

Generally, industrially available siloxane compounds contain hydrocarbon compounds and siloxane compounds (siloxane polymers) having high boiling points although the amount thereof is very minute. For example, hexamethyldisiloxane contains minute amounts of ingredients of the formula 1 in which n ranges from 1 to 5 and ingredients of the formula 2 in which m ranges from 3 to 7.

Consequently, if general, industrially available siloxane compounds are employed as they are in the present invention, the precise clean surface desired in the present invention cannot be obtained.

Investigations of the above matter have shown that in the hexamethyldisiloxane-containing composition, it is requisite that the hexamethyldisiloxane as a raw material of the composition have a purity of at least 99.0% by weight, that the content of ingredients having boiling points as high as from 210° to 230° C. (lowly volatile ingredients) in the hexamethyldisiloxane be less than 0.01% by weight, and that the hexamethyldisiloxane do not contain any ingredients having boiling points higher than 230° C. (lowly volatile ingredients). Unless the above conditions are satisfied, slight stains would be visible on the surface of the cleaned object after hand cleaning or finish drying with the result that a precise clean surface cannot be obtained.

The terminology "do not contain any" used herein means that none is detected by gas chromatography analysis in which use is made of an FID detector and a capillary column. The detection sensitivity thereof is a level detecting at least several parts per million (ppm).

The above limitations regarding the water content and the content of ingredients having boiling points higher than that of dodecamethylpentasiloxane are also applicable to mixtures of hexamethyldisiloxane and other organic compounds.

EXAMPLE 1

Commercially available hexamethyldisiloxane having a viscosity of 0.65 cSt (25° C.) (produced by Shin-Etsu Chemical Co., Ltd.) was purified to remove impurities. Analysis by gas chromatography showed that the commercially available hexamethyldisiloxane had a purity of 98.5% and contained hydrocarbon compounds less volatile than hexamethyldisiloxane and siloxanes each having a viscosity of not lower than 5 cSt as impurities. These impurities would remain on an object finish cleaned as a residue, so that it was required to conduct a treatment for removing ingredients less volatile than hexamethyldisiloxane. The removal of the impurities was carried out by appropriate means such as distillation, rectification and adsorption with an adsorbent.

Table 1 shows test results of the thus obtained hexamethyldisiloxane, in which n is the same n of the above formula 1 and the viscosity is one measured at 25° C. In this table, freon-ethanol azeotropic solution and a 3:1 mixed solution of ether-ethanol are used as comparative examples.

TABLE 1

| | | Example 1 | | | | | Comparative Example | |
|---|---|---|---|---|---|---|---|---|
| n | | 0 | 1 | 2 | 3 | 4 | Ether-Ethanol | Freon-Ethanol |
| Viscosity (25° C.) | | 0.65 | 1 | 1.5 | 2 | 2.63 | | |
| Evaluation | Attacking property | ○ | ○ | ○ | ○ | ○ | x | ○ |
| | Drying rate | ○ | ○ | ○ | ○ | ○ | ○ | ○ |

TABLE 1-continued

|   | | Example 1 | | | | | Comparative Example | |
|---|---|---|---|---|---|---|---|---|
| n | | 0 | 1 | 2 | 3 | 4 | Ether-Ethanol | Freon-Ethanol |
| Degreasing power | | o | o | o | o | o | o | o |
| Safety | Environment | o | o | o | o | o | o | x |
|  | Human organism | o | o | o | o | o | x | Δ |

The test methods and evaluation criteria employed in the examples will be described below.

(1) Attacking property to various materials

A plate composed of each of aluminum, stainless steel (SUS 304), copper, glass, PP (polypropylene), PC (polycarbonate), PMMA (polymethyl methacrylate) and ABS (acrylonitrile-butadiene-styrene terpolymer) was immersed in the solutions shown in Table 1. 48 hours later, the weight change was measured and the appearance was checked. The appearance check was made by observing any occurrence of cracking by means of a 50-magnifications stereo-microscope. The results are shown in the column "attacking property" of Table 1, in which "o" indicates that with respect to all the materials the weight change was less than 0.1% and there were no discernible appearance changes. "x" indicates that the weight change was not less than 0.1% with respect to all the materials and the appearance change occurred with respect to at least one of the materials. In the ether-ethanol mixed solution as a comparative example, cracking occurred in the plates of PC, PMMA and ABS.

(2) Drying rate

Each solution of Table 1 was placed in a beaker and a glass plate was immersed therein. Then, the glass plate was vertically taken out and its dried state was checked.

The immersed glass plate was a slide glass generally used in preparation of a specimen for a microscope and having its one-side surface roughened into a cloud state. The results are shown in the column "Drying rate" of Table 1, in which "o" indicates that the drying was completed within 60 seconds and "x" indicates that the drying required 61 seconds or more.

(3) Degreasing power

A fingerprint (sebum) was impressed on a glass plate in an area of 1 cm$^2$ and wiped by means of a cotton cloth (5 cm×5 cm) impregnated with 3 ml of each solution of Table 1 to test its degreasing power. In the test, the number of wipings required for the complete removal of the fingerprint was counted. The results are shown in the column "Degreasing power" of Table 1, in which "o" indicates that the number of wipings required for the removal of the fingerprint was not greater than 5 and "x" indicates that the number of wipings required for the removal of the fingerprint was at least 6.

(4) Safety

The presence or absence of environment hazard is shown in the column "Environment" of Table 1, in which "o" indicates the absence of environment hazard and "x" indicates the presence of environment hazard.

The adverse effect on the human organism is shown in the column "Human organism" of Table 1, in which "o" indicates the exertion of no adverse physiological activity, "Δ" the exertion of a weak adverse physiological activity and "x" the exertion of a strong adverse physiological activity.

Each solution of Table 1 was placed in a hand wrap and used to conduct hand finishing of each of plastic plates of PMMA, glass-reinforced PC, PP and ABS. As a result, no attacking property was observed in all the plastic plates, thereby showing good performance.

EXAMPLE 2

Commercially available hexamethyldisiloxane was purified through distillation, rectification and absorption with an absorbent, thereby removing hydrocarbons less volatile than hexamethyldisiloxane, siloxanes each having a viscosity of not lower than 1 cSt (25° C.), etc. as impurities. The reason is that these impurities would remain on an object cleaned as a residue. The thus purified hexamethyldisiloxane was analyzed by gas chromatography and found to have a purity of not lower than 99.0%. Further, the hexamethyldisiloxane had a viscosity of 0.65 cSt (25° C.).

100 g of each of the thus purified hexamethyldisiloxane and ethanol having a purity of not lower than 99.5% were placed in a distillation flask and the resultant 200 g in total was rectified in a rectifying column having a theoretical plate number of 30 under atmospheric pressure. An azeotropic fraction was obtained at 71.4° C. by the rectification. This fraction had a composition of 64.3–63.3% of hexamethyldisiloxane and 35.7–36.7% of ethanol as analyzed by gas chromatography.

In this Example, a stabilizer and/or solvent can be added. Examples of the stabilizers include aliphatic nitro compounds such as nitromethane, nitroethane, nitrobutane and the like; acetylene alcohols such as 3-methyl-1-butyn-3-ol, 3-methyl-1-pentyn-3-ol and the like; epoxides such as glycidol, methyl (glycidyl ether, allyl glycidyl ether, phenyl glycidyl ether, 1,2-butylene oxide, cyclohexene oxide, epichlorohydrin and the like; ethers such as dimethoxymethane, 1,2-dimethoxyethane, 1,4-dioxene, 1,3,5-trioxene and the like; unsaturated hydrocarbons such as hexene, heptene octene, 2,4,4-trimethyl-1-pentene, pentadiene, octadiene, cyclohexene, cyclopentene and the like; olefinic alcohols such as allyl alcohol, 1-buten-3-ol, 3-methyl-1-buten-3-ol and the like, acrylic esters such as methyl acrylate, ethyl acrylate, butyl acrylate and the like; and mixtures thereof. Furthermore, these compounds can be used in combination with phenols such as phenol, trimethylphenol, cyclohexylphenol, thymol, 2,6-di-t-butyl-4-methylphenol, butylhydroxyanisole, isooygenol and the like; amines such as hexylamine, pentylamine, dipropylamine, diisopropylamine, diisobutylamine, triethylamine, tributylamine, pyridine, N-methylmorpholine, cyclohexylamine, 2,2,6,6-tetramethyl piperidine, N,N'-diallyl-p-phenylenediamine and the like; and triazoles such as benzotriazole, 2-(2'-hydroxy-5'-methylphenyl)benzotriazole, chlorobenzotriazole and the like. For example, the above stabilizer can be added in an amount of 0.1–10 wt % so that property stabilization is achieved without detriment to the performance of the final cleaning and drying solvent.

Examples the solvents which can be added include hydrocarbons such as pentane, isopentane, hexane, isohexane, heptane and the like; nitroalkanes such as nitromethane, nitroethane, nitropropane and the like; amines such as diethylamine, triethylamine, isopropylamine, butylamine, isobutylamine and the like; alcohols such as methanol, n-propyl alcohol, i-propyl alcohol, n-butanol, i-butanol and the like; ethers such as methylcellosolve, tetrahydrofuran, 1,4-dioxane and the like; ketones such as acetone, methyl ethyl ketone, methyl butyl ketone and the like; esters such as ethyl acetate, propyl acetate, butyl acetate and the like; and mixtures thereof. For example, the above solvent can be added in an amount of 1–20 wt % to increase the dissolving power of the final cleaning and drying solvent.

EXAMPLE 3

200 g each of mixtures were prepared by mixing hexamethyldisiloxane purified in Example 2 with ethanol in amounts varied from 99.0 to 10.0% and from 1.0 to 90.0%, respectively, by every wt %, and the boiling points of such mixtures were measured. The results are shown in columns labeled "Before distillation" and "Observed boiling point" in Table 2. Mixtures each having a hexamethyldisiloxane content of greater than 35.0 wt % are azeotrope-like compositions similar to the azeotropic composition of Example 2 because the increases in boiling point from the azeotropic point of the composition of Example 2 (71.4° C.) are individually smaller than 1.0° C. The mixtures are referred to as products of Example 3 hereinafter.

In this example as well, the stabilizer and/or solvent described in Example 2 can be added.

(acrylonitrile-butadiene-styrene terpolymer) was provided as an object to be hand cleaned, and the surface thereof was finished by hand. No problems such as the attacking property were revealed with respect to all the plastic plates.

Then, a test specimen having a size of 5×50×2 mm made of each above plastic was placed in a glass bottle, and 100 g of each of the mixed solutions of Example 2 having their mixing ratios varied every wt % was charged therein. Each test specimen was allowed to stand at room temperature under ordinary humidity for 48 hours and taken out to measure any weight and appearance changes. A mixed solution of ether and ethanol (ether:ethanol=3:1) and freon 113 were similarly used as comparative examples. The results are shown in Table 3. In this table, "o" indicates that the weight change was less than 1% and there was neither cracking nor dissolution. "Δ" indicates that the weight change was not less than 1% while there was no cracking and dissolution. "x" indicates that the weight change was not less than 1% and both cracking and dissolution occurred. Table 3 shows only a part of the results of the mixed solutions of hexamethyldisiloxane and ethanol having their mixing ratios varied every wt %.

TABLE 2

| | | | | | | | | | |
|---|---|---|---|---|---|---|---|---|---|
| Before distillation | Ethanol (%) | 1 | 29 | 30 | 36 | 45 | 46 | 65 | 66 |
| | Hexamethyldisiloxane (%) | 99 | 71 | 70 | 64 | 55 | 54 | 35 | 34 |
| Observed boiling point | °C. | 72.2 | 71.6 | 71.6 | 71.4 | 71.7 | 71.7 | 72.4 | 72.5 |
| Distillate | Ethanol (%) | 33 | 34 | 36 | 36 | 37 | 37 | 42 | 42 |
| | Hexamethyldisiloxane (%) | 67 | 66 | 64 | 64 | 63 | 63 | 58 | 58 |
| Distillation residue | Ethanol (%) | 0 | 28 | 28 | 36 | 39 | 39 | 67 | 67 |
| | Hexamethyldisiloxane (%) | 100 | 72 | 72 | 64 | 61 | 61 | 33 | 33 |

EXAMPLE 4

200 g each of mixtures were prepared by mixing hexamethyldisiloxane purified in Example 2 with ethanol in amounts varied from 99.0 to 10.0% and from 1.0 to 90.0%, respectively, every wt %. These mixtures were each placed in a distillation flask, and single distillation was performed. The mixture before distillation, distillate and distillation residue were analyzed by gas chromatography. The results are shown in Table 2 appearing in Example 3. Table 2 shows the results of only a part of the mixtures having their compositions varied every wt %.

When the composition before distillation is compared with the distillate composition, the composition change is not more than 5 wt % with respect to the compositions of 70.0–55.0 wt % of hexamethyldisiloxane and 30.0–45.0 wt % of ethanol. Each of the distillates having a composition change of within 5 wt % can be used as an azeotrope-like composition in the same manner as in Example 2 and is referred to as a product of Example 4 hereinafter. In this Example as well, a stabilizer and/or solvent can be added as in Example 1.

EXAMPLE 5

In this Example, the inspection of each of the products of Examples 2, 3 and 4 is described. First, each of the distillate of Example 2 and the product of Example 3 was placed in a hand wrap and used as a hand finishing solution. Each of plastic plates of PMMA (polymethyl methacrylate), glass-filled PC (polycarbonate), PP (polypropylene) and ABS

TABLE 3

| | PMMA | PC (reinforced with glass) | PP | ABS |
|---|---|---|---|---|
| Hexamethyldisiloxane:Ethanol = 90:10 | o | o | o | o |
| Hexamethyldisiloxane:Ethanol = 70:30 | o | o | o | o |
| Hexamethyldisiloxane:Ethanol = 64:36 | o | o | o | o |
| Hexamethyldisiloxane:Ethanol = 50:50 | o | o | o | o |
| Ether:Ethanol = 3:1 mixed solution | x | x | Δ | x |
| Freon 113 | o | o | Δ | o |

Furthermore, a glass lens, plastic lenses of PMMC and PC and aluminum were used as objects to be cleaned and then cleaned according to the following procedure. Illustratively, each object was first degreased with an alkali saponifying agent under supersonic wave exposure and next again degreased with a surfactant under supersonic wave exposure. Thereafter, each object was washed with clean water under supersonic wave exposure to remove the surfactant and further washed with demineralized water under supersonic wave exposure to remove any ions and contaminants of the clean water, thereby enhancing the cleaning degree. Then, each object was cleaned with IPA to remove the demineralized water.

Then, each fraction obtained in Example 2 and the product of Example 4 were used as finish drying solutions. Each object was immersed in the solutions separately and taken therefrom to dry the same. Thereafter, the finished state of each object was observed. In this Example, IPA steam was used for finish drying as a comparative example. None of the fractions of Example 2 and the product of Example 4 caused each object to suffer from deterioration or to have residues left, thereby attesting to excellent results.

EXAMPLE 6

Commercially available hexamethyldisiloxane was purified through distillation, rectification and adsorption with an adsorbent to remove hydrocarbons less volatile than hexamethyldisiloxane, siloxanes each having a viscosity of not lower than 1 cSt (25° C.), etc. as impurities. The thus purified hexamethyldisiloxane was analyzed by gas chromatography, and it was found that the purity was not lower than 99.0%. Further, the hexamethyldisiloxane was found to have a viscosity of 0.65 cSt (25° C.).

200 g of a 1:1 by weight mixture of the thus purified hexamethyldisiloxane and methanol was placed in a distillation flask and rectified in a rectifying column having a theoretical plate number of 30 under atmospheric pressure. An azeotropic fraction was obtained at 58.7° C. by this distillation. Analysis by gas chromatography showed that the above fraction was composed of 58.9–59.3 wt % of hexamethyldisiloxane and 40.7–41.1 wt % of methanol. Furthermore, compositions composed of 30–95 wt % of hexamethyldisiloxane and 5–70 wt % of methanol were prepared as azeotrope-like compositions.

In this Example, a stabilizer and/or solvent can be added. Examples of the stabilizers include aliphatic nitro compounds such as nitromethane, nitroethane, nitrobutane and the like; acetylene alcohols such as 3-methyl-1-butyn-3-ol, 3-methyl-1-pentyn-3-ol and the like; epoxides such as glycidol, methyl glycidyl ether, allyl glycidyl ether, phenyl glycidyl ether, 1,2-butylene oxide, cyclohexene oxide, epichlorohydrin and the like; ethers such as dimethoxymethane, 1,2-dimethoxyethane, 1,4-dioxene, 1,3,5-trioxene and the like; unsaturated hydrocarbons such as hexene, heptene, octene, 2,4,4-trimethyl-1-pentene, pentadiene, octadiene, cyclohexene, cyclopentene and the like; olefinic alcohols such as allyl alcohol, 1-buten-3-ol, 3-methyl-1-buten-3-ol and the like; acrylic esters such as methyl acrylate, ethyl acrylate, butyl acrylate and the like; phenols such as phenol, trimethylphenol, cyclohexylphenol, thymol, 2, 6-di-t-butyl-4-methylphenol, butylhydroxyanisole, isooygenol and the like; amines such as hexylamine, pentylamine, dipropylamine, diisopropylamine, diisobutylamine, triethylamine, tributylamine, pyridine, N-methylmorpholine, cyclohexylamine, 2,2,6,6-tetramethylpiperidine, N,N'-diallyl-p-phenylenediamine and the like; triazoles such as benzotriazole, 2-(2'-hydroxy-5'-methylphenyl)benzotriazole, chlorobenzotriazole and the like; and mixtures thereof. For example, the above stabilizer can be added in an amount of 10 ppm–10 wt %, preferably 0.1–10 wt % to provide the final cleaning and drying solvent with more stable properties without detriment to the performances thereof.

Examples of the solvents which can be added include ketones such as acetone, methyl ethyl ketone, methyl isobutyl ketone and the like; esters such as ethyl acetate, isopropyl acetate, methyl propionate and the like; hydrocarbons such as n-hexane, 2-methylpentane, heptane and the like; and ethers such as diethyl ether, dioxane and the like. For example, the above solvent can be added in an amount of 1–20 wt % to increase the dissolving power of the final cleaning and drying solvent and to improve its grease and fat removing effect in the cleaning.

EXAMPLE 7

200 g of a 1:1 by weight mixture of hexamethyldisiloxane purified in Example 6 and 2-propanol was placed in a distillation flask and rectified in a rectifying column having a theoretical plate number of 30 under atmospheric pressure. An azeotropic fraction was obtained at 76.4° C. by this rectification. Analysis by gas chromatography showed that this fraction was composed of 54.1–54.5% of hexamethyldisiloxane and 45.5–45.9% of 2-propanol. Furthermore, compositions composed of 25–95 wt % of hexamethyldisiloxane and 5–75 wt % of 2-propanol were prepared as azeotrope-like compositions.

The stabilizer and/or solvent set forth in Example 6 can be added to the above compositions. This addition leads to more stable properties and improved dissolving power of the final cleaning and drying solvent without degrading the performance thereof.

EXAMPLE 8

In this example, the inspection of each of the products of Examples 6 and 7 is described.

First, each of the distillates and like compositions of Examples 6 and 7 was placed in a hand wrap container and used as a hand finishing solution. Each of plastic plates of PMMA (polymethyl methacrylate), glass-filled PC (polycarbonate), PP (polypropylene) and ABS (acrylonitrile-butadiene-styrene terpolymer) was provided as an object to be hand cleaned, and the surface thereof was finished by hand. No problems such as the attacking property were revealed with respect to all the plastic plates.

Then, a test specimen having a size of 5×50×2 mm made of each above plastic was placed in a glass bottle, and 100 g of each of the mixed solutions specified in Table 4 was charged therein. Each test specimen was allowed to stand at room temperature under ordinary humidity for 48 hours and taken out to measure any weight and appearance changes. A mixed solution of ether and ethanol (ether:ethanol=3:1) and freon 113 were similarly used as comparative examples. The results are shown in Table 4. In this table, "o" indicates that the weight change was less than 1% and there was neither cracking nor dissolution. "Δ" indicates that the weight change was not less than 1% while there was no cracking and dissolution. "x" indicates that the weight change was not less than 1% and both cracking and dissolution occurred.

TABLE 4

|  | PMMA | PC (re-inforced with glass) | PP | ABS |
| --- | --- | --- | --- | --- |
| Hexamethyldisiloxane:Methanol = 59.1:40.9 (Azeotrope) | o | o | o | o |
| Hexamethyldisiloxane:Methanol = 90:10 | o | o | o | o |
| Hexamethyldisiloxane:Methanol = 80:20 | o | o | o | o |
| Hexamethyldisiloxane:Methanol = 50:50 | o | o | o | o |
| Hexamethyldisiloxane:2-propanol = | o | o | o | o |

TABLE 4-continued

| | PMMA | PC (reinforced with glass) | PP | ABS |
|---|---|---|---|---|
| 54.3:45.6 (Azeotrope) | | | | |
| Hexamethyldisiloxane:2-propanol = 90:10 | o | o | o | o |
| Hexamethyldisiloxane:2-propanol = 75:25 | o | o | o | o |
| Hexamethyldisiloxane:2-propanol = 60:40 | o | o | o | o |
| Ether:Ethanol=3:1 mixed solution | x | x | Δ | x |
| Freon 113 | o | o | Δ | o |

Each of the compositions of Examples 6 and 7 was placed in a hand wrap container, and a clean wiping paper was impregnated with a proper amount of each composition from the hand wrap container. An optical lens having a centering oil after optical centering work adhering thereto was cleaned with the clean wiping paper by hand. Thus, good results were obtained such that the centering oil could completely be removed to thereby clean the optical lens without yellowing the optical lens. Also, when the same test was carried out by using the azeotrope-like compositions of Examples 6 and 7, good results were obtained.

Moreover, a glass lens, plastic lenses of PMMC and PC and aluminum were cleaned according to the following procedure. Illustratively, each object was first degreased with an alkali saponifying agent under supersonic wave treatment and next again degreased with a surfactant under supersonic wave treatment. Thereafter, each object was washed with clean water under supersonic wave treatment to remove the surfactant and further washed with demineralized water under supersonic wave treatment to remove any ions and contaminants of the clean water, thereby enhancing the cleaning degree. Then, each object was cleaned with IPA (2-propanol) to remove the demineralized water.

Then, each of the fractions and azeotrope-like compositions of Examples 6 and 7 was used as a finish drying solution. Each object to be cleaned was immersed in the solution and taken therefrom to dry the same. Thereafter, the finished state of each object was observed. In this Example, IPA steam was used for finish drying as a comparative example. None of the fractions and azeotrope-like compositions of Examples 6 and 7 caused each object to suffer from deterioration or to have residues left, thereby attesting to excellent results.

EXAMPLE 9

Commercially available hexamethyldisiloxane was purified through distillation, rectification and adsorption with an adsorbent to remove hydrocarbons less volatile than hexamethyldisiloxane, siloxanes each having a viscosity of not lower than 1 cSt (25° C.), etc. as impurities. The thus purified hexamethyldisiloxane was analyzed by gas chromatography, and it was found that the purity was not lower than 99.0%.

A composition of this Example was prepared by mixing 90% of the thus purified hexamethyldisiloxane and 10% of acetone. This composition was placed in a hand wrap container, and a clean wiping paper was impregnated with a proper amount of the composition from the hand wrap container. The resultant clean wiping paper was used in hand cleaning of an optical lens covered with a centering oil after optical centering work, hand cleaning of the molding surface of plastic injection molding dies covered with a releasing agent, gas burning residue or other stains, hand cleaning of an industrial photographic film of polyethylene terephthalate having sebum stains such as fingerprints adhering thereto, and cleaning of a camera body of polyphenylene sulfide having sebum stains such as fingerprints adhering thereto. The results are shown in Table 5. The composition of this example was able effect excellent cleanings of the optical lens, molding dies, industrial photographic film and camera body without causing any damage to these objects. Moreover, similar cleanings were performed using a mixed solvent of ethanol and diethyl ether and freon 113 as comparative examples and the results are shown in Table 5.

TABLE 5

| | Optical lens | Molding dies | Photographic film | Camera body |
|---|---|---|---|---|
| Acetone:Hexamethyldisiloxane = 10:90 | o | o | o | o |
| Methyl isobutyl ketone:Hexamethyldisiloxane = 10:90 | o | o | o | o |
| 3-pentanone:Hexamethyldisiloxane = 15:85 | o | o | o | o |
| Methyl ethyl ketone:Hexamethyldisiloxane = 5:95 | o | o | o | o |
| Methyl propionate:Hexamethyldisiloxane = 25:75 | o | o | o | o |
| Methyl propionate:Hexamethyldisiloxane = 10:90 | o | o | o | o |
| Isopropyl acetate:Hexamethyldisiloxane = 15:85 | o | o | o | o |
| Ethyl acetate:Hexamethyldisiloxane = 5:95 | o | o | o | o |
| n-hexane:Hexamethyldisiloxane = 25:75 | o | o | o | o |
| n-hexane:Hexamethyldisiloxane = 10:90 | o | o | o | o |
| Cyclopentane:Hexamethyldisiloxane = 15:85 | o | o | o | o |
| Cyclohexane:Hexamethyldisiloxane = 5:95 | o | o | o | o |
| tert-butyl alcohol:Hexamethyldisiloxane = 25:75 | o | o | o | o |
| tert-butyl alcohol:Hexamethyldisiloxane = 10:90 | o | o | o | o |
| 1-propanol:Hexamethylidisiloxane = 15:85 | o | o | o | o |
| Isobutyl alcohol:Hexamethyldisiloxane = 5:95 | o | o | o | o |
| Ether:Ethanol = 3:1 mixed solution | o | o | o | o |
| Freon 113 | Δ | o | o | o |

In the above Table, "o" indicates that the stains could completely be removed and no damage was caused to all the objects cleaned. "Δ" indicates that either the stains could not completely be removed or some damage was caused to the objects. "x"indicates that either no stains could be removed or extreme damage was caused to the objects.

In this Example, similar cleaning was conducted by the use of a composition prepared by mixing hexamethyldisiloxane with each of methyl isobutyl ketone, 2-pentanone, 3-pentanone and methyl ethyl ketone in substitution for acetone. The compound mixing ratios of these compositions and cleaning results are also specified in Table 5.

In this Example, further, a multiplicity of compositions were prepared by adding a stabilizer to the above compositions. The employed stabilizers included aliphatic nitro compounds such as nitromethane, nitroethane, nitropropane and the like; acetylene alcohols such as 3-methyl-1-butyn-3-ol, 3-methyl-1-pentyn-3-ol and the like; epoxides such as glycidol, methyl glycidyl ether, allyl glycidyl ether, phenyl glycidyl ether, 1,2-butylene oxide, cyclohexene oxide, epichlorohydrin and the like; ethers such as dimethoxymethane, 1,2-dimethoxyethane, 1,4-dioxane, 1,3,5-trioxene and the like; unsaturated hydrocarbons such as hexene, heptene, octene, 2,4,4-trimethyl-1-pentene, pentadiene, octadiene, cyclohexene, cyclopentene and the like; olefinic alcohols such as allyl alcohol, 1-buten-3-ol, 3-methyl-1-buten-3-ol and the like, acrylic esters such as methyl acrylate, ethyl acrylate, butyl acrylate and the like; and mixtures thereof. Furthermore, these compounds were used in combination with phenols such as phenol, trimethylphenol, cyclohexylphenol, thymol, 2,6-di-t-butyl-4-methylphenol, butylhydroxyanisole, isooygenol and the like; amines such as hexylamine, pentylamine, dipropylamine, diisopropylamine, diisobutylamine, triethylamine, tributylamine, pyridine, N-methylmorpholine, cyclohexylamine, 2,2,6,6-tetramethyl-piperidine, N,N'-diallyl-p-phenylenediamine and the like; and triazoles such as benzotriazole, 2-(2'-hydroxy-5'-methylphenyl)benzotriazole, chlorobenzotriazole and the like. The above stabilizer was added in an amount of 0.1–10 wt % to provide a more stabilized composition without detriment to the performance thereof.

EXAMPLE 10

A composition was prepared by mixing 95% of hexamethyldisiloxane purified to a purity of not lower than 99.0% with 5% of ethyl acetate in the same manner as in Example 9, and the same hand cleaning as in Example 9 was conducted. Furthermore, the same hand cleaning was conducted by the use of compositions prepared by mixing the above hexamethyldisiloxane with each of methyl propionate and isopropyl acetate. These compositions and cleaning results are specified in Table 5. All the compositions gave good cleaning results without causing any damage to the objects cleaned. Moreover, similar results were obtained by using isobutyl formate, propyl acetate, ethyl propionate and methyl lactate in substitution for the above carboxylic esters.

When each of the above compositions was mixed with the same stabilizer as in Example 9 at the same mixing ratio, a stability improvement was attained without degradation of the performance thereof.

EXAMPLE 11

A composition was prepared by mixing 90% of hexamethyldisiloxane purified to a purity of not lower than 99.0% with 10% of n-hexane in the same manner as in Example 9, and then the same hand cleaning as in Example 9 was conducted. Furthermore, the same hand cleaning was conducted by the use of compositions prepared by mixing the above hexamethyldisiloxane with each of cyclopentane and cyclohexane. These compositions and cleaning results are specified in Table 5. All the compositions gave good cleaning results without causing any damage to the objects cleaned. Moreover, similar results were obtained by using pentane, 2-methylbutane, 2-methylpentane, 2,2-dimethylbutane, 2,3-dimethylbutane, various heptanes, heptane isomers, 2,2,3-trimethylpentane, isooctane, methylcyclopentane and methylcyclohexane in substitution for the above saturated hydrocarbons. When each of the above compositions was mixed with the same stabilizer as in Example 9 at the same mixing ratio, a stability improvement was attained without degradation of the performance thereof.

EXAMPLE 12

A composition was prepared by mixing 95% of hexamethyldisiloxane purified to a purity of not lower than 99.0% with 5% of isobutyl alcohol in the same manner as in Example 9, and then the same hand cleaning as in Example 9 was conducted. Furthermore, the same hand cleaning was conducted by the use of compositions prepared by mixing the above hexamethyldisiloxane with each of 1-propanol and tert-butyl alcohol. These compositions and cleaning results are specified in Table 5. All the compositions gave good cleaning results without causing any damage to the objects cleaned. Moreover, similar results were obtained by using tert-pentyl alcohol in substitution for the above alcohols.

When each of the above compositions was mixed with the same stabilizer as in Example 9 at the same mixing ratio, a stability improvement was attained without degradation of the performance thereof.

EXAMPLE 13

Commercially available hexamethyldisiloxane (produced by Dow Corning Corporation) was purified by the use of a distillation column having a theoretical plate number of at least 30. The resultant hexamethyldisiloxane was analyzed by gas chromatography, and it was confirmed that the purity was at least 99.0% and no ingredients having boiling points higher than that of hexamethyldisiloxane were detected. 300 ml of the purified hexamethyldisiloxane was put in a clean beaker, and dodecamethylpentasiloxane having a boiling point of 229° C. was added 0.001 wt % by 0.001 wt %. At each of varied dodecamethylpentasiloxane concentrations, a clean slide glass was immersed in the solution, taken out and dried by 80° C. hot air. Each slide glass was subjected to the evaluation of stain and residue by stereo-microscopic observation (observed in 20 magnifications) and exhalation test in which the evaluation was made from a clouding state resulting from exhalation. Likewise decamethylcyclopentasiloxane (b.p. 210° C.) was added 0.001 wt % by 0.001 wt %, and the same experiment and evaluation were conducted.

Further, tetradecamethylhexasiloxane was likewise added 0.001 wt % by 0.001 wt %, and the same experiment and evaluation were conducted. Tetradecamethylhexasiloxane has one more dimethylsiloxane unit than dodecamethylpentasiloxane and thus has a higher molecular weight and a higher boiling point (b.p. of tetradecamethylhexasiloxane: 142° C. at 20 mmHg). With respect to the evaluation criteria for stain and residue, "o" indicates that stain and residue are not observed in both the stereo-microscopic observation and the exhalation test, and "x" indicates that stain and residue are observed in at least either of them.

The above hexamethyldisiloxane was used to prepare an azeotropic composition of hexamethyldisiloxane and ethanol, an azeotropic composition of hexamethyldisiloxane and methanol and an azeotropic composition of hexamethyldisiloxane and 2-propanol as in Example 2, Example 6 and Example 7, respectively, and the above experiment and evaluation were conducted. The results are given in Tables 6 and 8. For comparison, commercially available hexamethyldisiloxane (produced by Shin-Etsu Chemical Co., Ltd. and Dow Corning Corporation) was subjected to the above evaluation, and stain and residue were observed in both the stereo-microscopic observation and the exhalation test. Analysis by gas chromatography showed that the commercially available hexamethyldisiloxane consisted of 98.7% of pure hexamethyldisiloxane, 0.45% of octamethyltrisiloxane (n=1 in formula 2, b.p. 153° C.), 0.25% of octamethylcyclotetrasiloxane (n=4 in formula 2, b.p. 172° C.), 0.15% of decamethyltetrasiloxane (n=2 in formula 1, b.p. 194° C.), 0.08% of decamethylcyclopentasiloxane (n=5 in formula 2, b.p. 210° C.), 0.05% of dodecamethylpentasiloxane (n=3 in formula 1, b.p. 229° C.), 0.03% of dodecamethylcyclohexasiloxane (n=6 in formula 2, b.p. 245° C.), 0.02% in total of ingredients having boiling points higher than that of dodecamethylcyclohexasiloxane and the balance of ingredients having boiling points equal to or below that of hexamethyldisiloxane.

The above results suggest that stain and residue would occur either if dodecamethylpentasiloxane or decamethylcyclopentasiloxane is contained in an amount of 0.010 wt % or more or if tetradecamethylhexasiloxane and other ingredients having boiling points higher than that of dodecamethylpentasiloxane are contained even in minute amounts. Therefore, for conducting precise cleaning free from stain and residue, it is requisite to apply a cleaning and drying solvent having hexamethyldisiloxane as an active ingredient wherein the content of ingredients having boiling points ranging from 210° to 230° C. is less than 0.010% by weight and which does not contain any ingredients having boiling points higher than 230° C.

EXAMPLE 14

Five water-content-varied azeotropic compositions were prepared by adding appropriate amounts of distilled water to each of an azeotropic composition of hexamethyldisiloxane and ethanol, an azeotropic composition of hexamethyldisiloxane and methanol and an azeotropic composition of hexamethyldisiloxane and 2-propanol obtained in Example 2, Example 6 and Example 7, respectively. The water content of each of the resultant azeotropic compositions was measured by the use of Karl Fischer's water content meter. 100 ml of each prepared azeotropic composition was put in a beaker, and a clean slide glass was immersed in the composition, taken out at a speed of 3 cm/min and dried. Immediately after the drying, the surface of the slide glass was visually observed. With respect to the evaluation criteria, "o" indicates that a clean dry surface entirely free of stain was obtained. "Δ" indicates that stain occurrence is scarcely observed after drying although the tendency toward granular water residue is observed. "x" indicates that stain occurrence is observed. The results are given in Table 7. It has been found that when the water content is 1000 ppm or higher, the tendency toward stain occurrence is observed, so that it is difficult to obtain a clean dry surface. Therefore, for obtaining a dry surface free of stain, it is requisite that the water content of the composition be less than 1000 ppm. The water content is preferably not higher than 800 ppm and, taking safety factor into account, still preferably not higher than 500 ppm.

TABLE 6

| | Dodecamethylpentasiloxane content (wt %) | | | | | | Tetradecamethylhexasiloxane content (wt %) | | | | | |
|---|---|---|---|---|---|---|---|---|---|---|---|---|
| | 0.001 | 0.002 | 0.005 | 0.009 | 0.010 | 0.011 | 0.001 | 0.002 | 0.005 | 0.009 | 0.010 | 0.011 |
| Hexamethyldisiloxane | o | o | o | o | x | x | x | x | x | x | x | x |
| Hexamethyldisiloxane/ ethanol azeotropic compsn. | o | o | o | o | x | x | x | x | x | x | x | x |
| Hexamethyldisiloxane/ methanol azeotropic compsn. | o | o | o | o | x | x | x | x | x | x | x | x |
| Hexamethyldisiloxane/ 2-propanol azeotropic compsn. | o | o | o | o | x | x | x | x | x | x | x | x |

TABLE 8

| | Decamethylcyclopentasiloxne content (wt %) | | | | | |
|---|---|---|---|---|---|---|
| | 0.001 | 0.002 | 0.005 | 0.009 | 0.010 | 0.011 |
| Hexamethyldisiloxane | o | o | o | o | x | x |
| Hexamethyldisiloxane/ ethanol azeotropic compsn. | o | o | o | o | x | x |
| Hexamethyldisiloxane/ methanol azeotropic compsn. | o | o | o | o | x | x |
| Hexamethyldisiloxane/ 2-propanol azeotropic compsn. | o | o | o | o | x | x |

TABLE 7

| | Water content (ppm) | | | | |
|---|---|---|---|---|---|
| | 1800 | 1200 | 1000 | 800 | 500 |
| Hexamethyldisiloxane/ ethanol azeotropic compsn. | x | Δ-x | o-Δ | o | o |
| Hexamethyldisiloxane/ methanol azeotropic compsn. | x | Δ-x | o-Δ | o | o |

TABLE 7-continued

| | \multicolumn{5}{c}{Water content (ppm)} | | | | |
|---|---|---|---|---|---|
| | 1800 | 1200 | 1000 | 800 | 500 |
| Hexamethyl-disiloxane/ 2-propanol azeotropic compsn. | x | Δ-x | o-Δ | o | o |

The cleaning and drying solvents according to the present invention are excellent in degreasing power and drying property and find applications in not only hand cleaning of industrial parts but also precise cleaning and drying after the cleaning. Furthermore, the cleaning and drying solvents of the present invention do not contain halogens, so that they can effectively be used as solvents replacing freon and free from depleting the ozone layer.

We claim:

1. A method of cleaning and drying an object which comprises contacting the object with a solvent, wherein said solvent consists essentially of hexamethyldisiloxane and ethanol, said hexamethyldisiloxane and said ethanol being present in respective amounts of 55 to 70% by weight and 30 to 45% by weight based on the weight of the solvent and forming azeotropic or azeotropic-like combination.

wherein said hexamethyldisiloxane is at least 99.0% weight pure, the amount of ingredients having boiling points ranging from 210° to 230° C. in said solvent is less than 0.01% by weight, and said solvent does not contain any ingredients having boiling points higher than 230° C.

2. The method according to claim 1, wherein the hexamethyldisiloxane and the ethanol are present in respective amounts of 63.3 to 64.3% by weight and 36.7 to 35.7% by weight based on the weight of the solvent.

3. A method of cleaning and drying an object which comprises contacting the object with a solvent, wherein said solvent consists essentially of hexamethyldisiloxane and methanol, said hexamethyldisiloxane and said methanol being present in respective amounts of 30 to 95% by weight and 5 to 70% by weight based on the weight of the solvent and forming azeotropic or azeotropic-like combination, wherein said hexamethyldisiloxane is at least 99.0% by weight pure, the amount of ingredients having boiling points ranging from 210° to 230° C. in said solvent is less than 0.01% by weight, and said solvent does not contain any ingredients having boiling points higher than 230° C.

4. The method according to claim 3, wherein the hexamethyldisiloxane and the methanol are present in respective amounts of 58.9 to 59.3% by weight and 41.1 to 40.7% by weight based on the weight of the solvent.

5. A method of cleaning and drying an object which comprises contacting the object with a solvent, wherein said solvent consists essentially of hexamethyldisiloxane and 2-propanol, said hexamethyldisiloxane and said 2-propanol being present in respective amounts of 25 to 95% by weight and 5 to 75% by weight based on the weight of the solvent and forming azeotropic or azeotropic-like combination, wherein said hexamethyldisiloxane is at least 99.0% by weight pure, the amount of ingredients having boiling points ranging from 210° to 230° C. in said solvent is less than 0.01% by weight, and said solvent does not contain any ingredients having boiling points higher than 230° C.

6. The method according to claim 5, wherein the hexamethyldisiloxane and the 2-propanol are present in respective amounts of 54.1 to 54.5% by weight and 45.5 to 45.9% by weight based on the weight of the solvent.

7. The method according to claim 2, wherein said solvent has a water content of less than 1000 ppm by weight.

8. The method according to claim 4, wherein said solvent has a water content of less than 1000 ppm by weight.

9. The method according to claim 6, wherein said solvent has a water content of less than 1000 ppm by weight.

* * * * *